(12) United States Patent  (10) Patent No.: US 9,081,520 B2
Mraz et al.  (45) Date of Patent: Jul. 14, 2015

(54) REMOTE PRINT FILE TRANSFER AND SPOOLING APPLICATION FOR USE WITH A ONE-WAY DATA LINK

(75) Inventors: Ronald Mraz, South Salem, NY (US); James Hope, Greenwich, CT (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 720 days.

(21) Appl. No.: 12/975,890

(22) Filed: Dec. 22, 2010

(65) Prior Publication Data

US 2012/0162697 A1  Jun. 28, 2012

(51) Int. Cl.
*G06F 3/12* (2006.01)
*H04L 29/06* (2006.01)

(52) U.S. Cl.
CPC .............. *G06F 3/1203* (2013.01); *G06F 3/126* (2013.01); *G06F 3/1222* (2013.01); *G06F 3/1244* (2013.01); *G06F 3/1288* (2013.01); *H04L 63/10* (2013.01); *G06F 3/127* (2013.01)

(58) Field of Classification Search
None
See application file for complete search history.

(56) References Cited

U.S. PATENT DOCUMENTS

| | | | | |
|---|---|---|---|---|
| 6,147,765 | A * | 11/2000 | Yoneda | 358/1.15 |
| 6,466,328 | B1 * | 10/2002 | Bradley et al. | 358/1.15 |
| 6,633,400 | B1 * | 10/2003 | Sasaki et al. | 358/1.15 |
| 7,242,487 | B2 * | 7/2007 | Lucivero et al. | 358/1.13 |
| 7,363,657 | B2 * | 4/2008 | Caccavale | 726/24 |
| 7,403,946 | B1 * | 7/2008 | Taylor | 707/612 |
| 7,511,841 | B2 * | 3/2009 | Bolloni | 358/1.15 |
| 7,672,003 | B2 * | 3/2010 | Dowling et al. | 358/1.15 |
| 8,139,581 | B1 * | 3/2012 | Mraz et al. | 370/392 |
| 8,352,450 | B1 * | 1/2013 | Mraz et al. | 707/705 |
| 2002/0089692 | A1 * | 7/2002 | Ferlitsch | 358/1.15 |
| 2002/0165894 | A1 * | 11/2002 | Kashani | 709/102 |
| 2004/0001215 | A1 * | 1/2004 | Kurotsu | 358/1.13 |
| 2004/0184074 | A2 * | 9/2004 | Leiman et al. | 358/1.15 |
| 2004/0207878 | A1 * | 10/2004 | Ferlitsch | 358/2.1 |
| 2005/0141007 | A1 * | 6/2005 | Shirai et al. | 358/1.13 |
| 2006/0023252 | A1 * | 2/2006 | Kanai | 358/1.15 |
| 2006/0165456 | A1 * | 7/2006 | Matsunaga et al. | 400/62 |
| 2008/0008207 | A1 * | 1/2008 | Kellum | 370/433 |
| 2008/0051032 | A1 * | 2/2008 | Hashimoto | 455/41.3 |
| 2008/0195688 | A1 * | 8/2008 | Watanabe | 709/201 |
| 2008/0259929 | A1 * | 10/2008 | Mraz | 370/395.1 |
| 2009/0225354 | A1 * | 9/2009 | Yonezawa | 358/1.15 |
| 2009/0271858 | A1 * | 10/2009 | Cooke et al. | 726/12 |
| 2010/0070670 | A1 * | 3/2010 | Abell | 710/302 |

(Continued)

OTHER PUBLICATIONS

International Search Report of the International Searching Authority corresponding to International Application No. PCT/US2011/056398 mailed Jan. 20, 2012.

(Continued)

*Primary Examiner* — Hilina K Demeter

(57) ABSTRACT

A system for printing includes one or more printers, a send platform, a print spooling platform coupled to the one or more printers, and a one-way data link enforcing unidirectional data transfer from the send platform to the print spooling platform, wherein the send platform is configured to receive a print job, convert the print job into a print file in a printable format for the one or more printers, and send the print file to the print spooling platform across the one-way data link, and the print spooling platform is configured to receive the print file from the one-way data link, control spooling of the print file for the one or more printers, and send the print file to the one or more printers, and wherein the one or more printers cannot communicate to the send platform.

24 Claims, 3 Drawing Sheets

(56) References Cited

U.S. PATENT DOCUMENTS

2010/0302579 A1* 12/2010 Nuggehalli et al. ......... 358/1.15
2011/0013215 A1*  1/2011 Yonezawa et al. .......... 358/1.14
2012/0042357 A1*  2/2012 Mraz .............................. 726/2
2012/0151075 A1*  6/2012 Mraz et al. ................... 709/230
2013/0254878 A1*  9/2013 Clarke et al. ................... 726/22

OTHER PUBLICATIONS

Written Opinion of the International Searching Authority corresponding to International Application No. PCT/US2011/056398 mailed Jan. 20, 2012.

* cited by examiner

REMOTE PRINT FILE TRANSFER AND SPOOLING APPLICATION FOR USE WITH A ONE-WAY DATA LINK

FIELD OF INVENTION

The present invention relates generally to unidirectional data transfer. More particularly, the present invention relates to the transmission of print files across a unidirectional data link.

BACKGROUND OF THE INVENTION

Protection of a computer or data network from undesired and unauthorized data disclosure, interception or alteration has been a perennial concern in the field of computer and network security. For example, firewall and anti-spyware software have been developed to address security concerns for computers and networks connected to the Internet and to protect them from possible cyber-attacks such as Trojan horse-type viruses or worms that may trigger undesired and unauthorized data disclosure by these computers and networks. However, for high security computer networks such as those used by government agencies and intelligence community and certain commercial applications, conventional network security devices such as firewalls may not provide sufficiently reliable protection from undesired data disclosure.

Alternative network security methods and devices based on unidirectional data transfer have been devised to address the network security concern. For example, U.S. Pat. No. 5,703,562 to Nilsen ("the '562 patent"), the content of which is hereby incorporated by reference in its entirety, provides an alternative way to address the network security concern. The '562 patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms 101 and 102 (respectively, "the send platform" and "the receive platform") are connected to the unsecured external network 104 ("the source network") and the secure network 105 ("the destination network"), respectively. The send platform 101 is connected to the receive platform 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the send platform and to an optical receiver on the receive platform.

A configuration such as the one shown in FIG. 1 physically enforces one-way data transfer at both ends of the optical fiber connecting the send platform 101 to the receive platform 102, thereby creating a truly unidirectional one-way data link between the source network 104 and the destination network 105. One-way data transfer systems based on a one-way data link are designed to transfer data or information in only one direction, making it physically impossible to transfer any kind of data, such as handshaking protocols, error messages, or busy signals, in the reverse direction. Such physically imposed unidirectionality in data flow cannot be hacked by a programmer, as is often done with firewalls. Accordingly, the one-way data transfer system based on a one-way data link ensures that data residing on the isolated secure computer or network is maximally protected from any undesired and unauthorized disclosure.

It has been found desirable to route and queue print jobs across a one-way data link. However, this poses unique challenges since the enforced unidirectionality of data transfer precludes any bilateral communications with a printer across the one-way data link, such as the transmission of error messages or busy signals from the printer or print server back to the send platform. Thus, it is an object of the present invention to facilitate routing and queuing of print jobs across a one-way data link.

Other objects and advantages of the present invention will become apparent from the following description.

SUMMARY OF THE INVENTION

It has been found that the above and related objects of the present invention are obtained in the form of several related aspects.

More particularly, at least one embodiment of the present invention relates to a system for printing, comprising one or more printers, a send platform, a print spooling platform coupled to the one or more printers, and a one-way data link enforcing unidirectional data transfer from the send platform to the print spooling platform, wherein (1) the send platform is configured to receive a print job, convert the print job into a print file in a printable format for the one or more printers, and send the print file to the print spooling platform across the one-way data link, and (2) the print spooling platform is configured to receive the print file from the one-way data link, control spooling of the print file for the one or more printers, and send the print file to the one or more printers, and wherein the one or more printers cannot communicate to the send platform.

In at least one further embodiment, the send platform in the system comprises a print server proxy application for converting the print job into the print file in the printable format.

In at least one further embodiment, the print spooling platform in the system comprises a print file capture application for spooling the print file for and sending the print file to the one or more printers.

In at least one further embodiment, the print spooling platform uses the MICROSOFT WINDOWS operating system.

In at least one further embodiment, the print spooling platform in the system comprises a first platform configured to receive the print file from the send platform across the one-way data link, and a second platform configured to receive the print file from the first platform, control spooling of the print file for the one or more printers, and send the print file to the one or more printers.

In at least one further embodiment, the second platform comprises a print file capture application for spooling the print files for and sending the print files to the one or more printers.

In at least one further embodiment, the first platform and the second platform use different operating systems.

In at least one further embodiment, the print file is transmitted across the one-way data link as a stream of segmented proprietary data packets.

In at least one further embodiment, the print file is stored in a subdirectory on the send platform before being transferred to the one-way data link.

In at least one further embodiment, the send platform monitors downloaded subdirectories for the print file to be sent across the one-way data link.

In at least one further embodiment, the print spooling platform monitors downloaded subdirectories for the print file to be sent to the one or more printers.

In at least one further embodiment, the print spooling platform runs a post-processing application to transfer the print file to the one or more printers.

In at least one further embodiment, the print spooling platform runs a TCP client application to automatically transfer the print file to the IP address of the one or more printers.

In at least one further embodiment, the print file is stored on the print spooling platform if the one or more printers are occupied or otherwise unavailable.

In at least one further embodiment, the send platform comprises a file scanning application for scanning the print file to be transferred across the one-way data link.

In at least one further embodiment, the file scanning application performs anti-virus scan on the print file.

In at least one further embodiment, the file scanning application filters on a file extension type of the print file.

In at least one further embodiment, the print file that fails the criteria of the file scanning application is quarantined.

In at least one further embodiment, the print spooling platform comprises a file scanning application for scanning the print file received from the one-way data link.

In at least one further embodiment, the file scanning application performs anti-virus scan on the print file.

In at least one further embodiment, the file scanning application filters on a file extension type of the print file.

In at least one further embodiment, the print file that fails the criteria of the file scanning application is quarantined.

Furthermore, at least one embodiment of the present invention relates to a system for printing, comprising a one-way data link for unidirectional data transfer, a send platform configured to receive a print job, convert the print job into a print file having a format that is recognizable to a printer, and send the print file across the one-way data link, and a print spooling platform configured to receive the print file from the one-way data link and manage printing of the print file.

In at least one further embodiment, the send platform comprises a print server proxy application for converting the print job into the print file.

In at least one further embodiment, the print spooling platform comprises a print file capture application for spooling the print file.

In at least one further embodiment, the print spooling platform comprises a first platform configured to receive the print file from the one-way data link, and a second platform configured to receive the print file from the first platform and manage printing of the print file.

In at least one further embodiment, the second platform comprises a print file capture application for spooling the print file.

Furthermore, at least one embodiment of the present invention relates to a method for printing, comprising the steps of receiving a print job, converting the print job into a print file in a printable format, and then transferring the print file across a one-way data link, receiving the print file from the one-way data link, and spooling the print file.

In at least one further embodiment, the method further comprises the step of sending the print file to a printer for printing.

In at least one further embodiment, the steps of receiving the print file and spooling the print file are performed on different platforms.

These and other features of this invention are described in, or are apparent from the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit illustrative and exemplary, embodiments of the present invention when taken in conjunction with the accompanying figures, wherein.

DETAILED DESCRIPTION OF THE EXEMPLARY EMBODIMENTS

Figure 1:
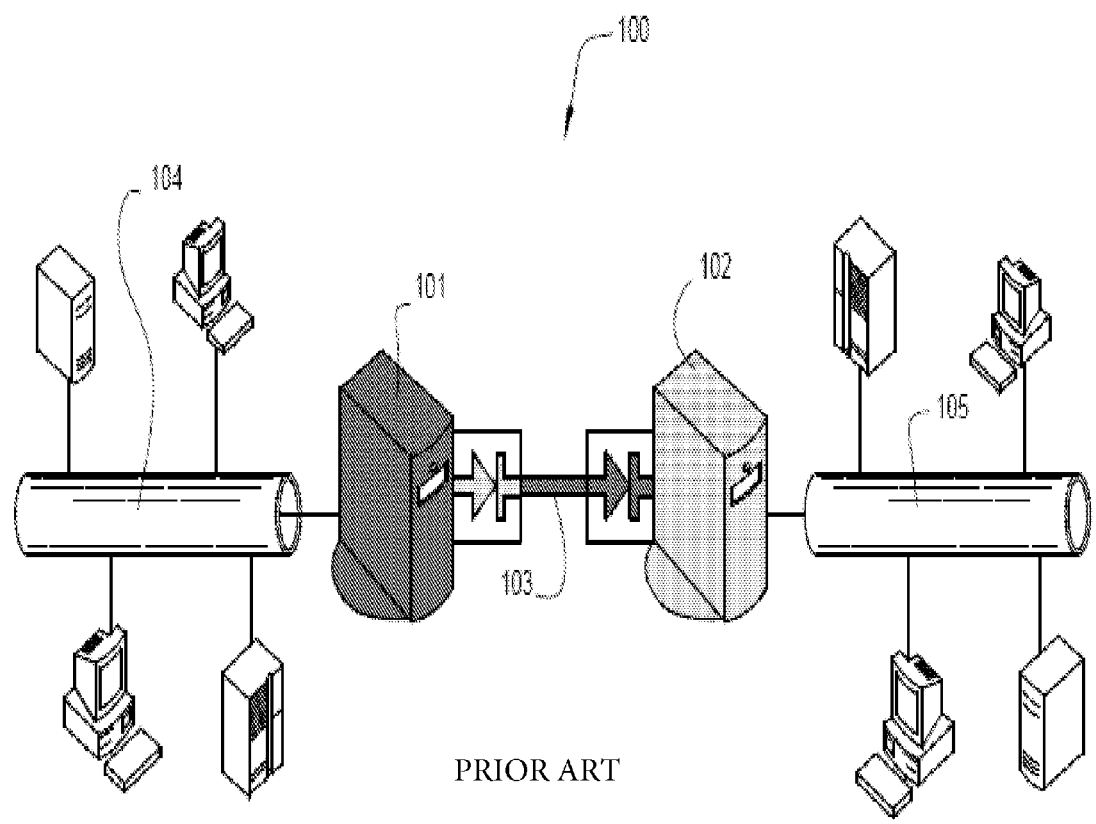
FIG. 1 schematically illustrates an example of a secure one-way data transfer system using a one-way data link.
Figure 2:
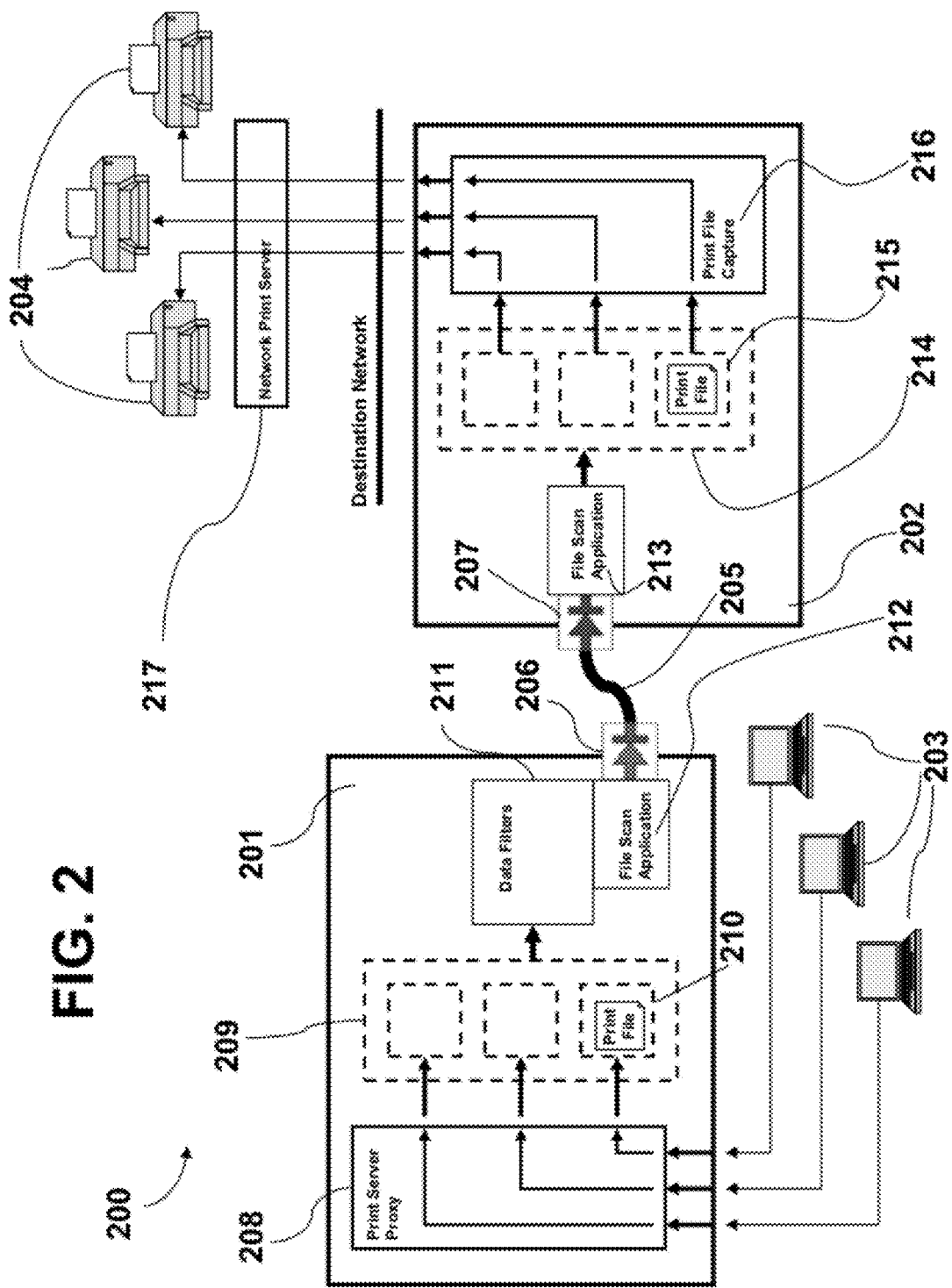
FIG. 2 is a schematic diagram of an exemplary embodiment of the present invention.

FIG. 2 schematically illustrates a system for routing and queuing print jobs across a one-way data link according to one exemplary embodiment of the present invention. The system 200 may generally comprise a send platform 201 and a receive platform 202, which may be connected to one another by a one-way data link 205. In some embodiments, the one-way data link 205 may comprise an optical fiber connected at one end to send-only interface circuitry 206 (e.g., optical transmitter) residing on or coupled to the send platform and connected at the opposite end to receive-only interface circuitry 207 (e.g., optical receiver) residing on or coupled to the receive platform. In such embodiments, the one-way data link 205, send-only interface circuitry 206 and receive-only interface circuitry 207 may be of the type described above with reference to FIG. 1 of the present application. Send platform 201 may comprise one or more computers running any suitable operating system known in the art, including, but not limited to, UNIX, MICROSOFT WINDOWS, or LINUX. In this embodiment, receive platform 202 may use MICROSOFT WINDOWS with Windows print spooling application.

Send platform 201 may be linked to one or more print sources 203 which may be other machines or computers capable of generating and sending a print job to the send platform. According to some embodiments, print source 203 print to a TCP/IP port maintained by a print server proxy application 208 described below. Additionally, print source 203 may be part of a network operating under a specific set of network security parameters, such as a lower security or higher security network.

A print server proxy application 208 may reside on send platform 201, receive a print job from print source 203 and convert the print job into one or more print files in a printable format that is recognizable to printer 204 and/or print server 217. Once converted from a print job, the print files may then be stored in a directory 209 or subdirectory 210 on the send platform 201 before being transferred to the print spooling platform 202 across the one-way data link 205. The directory/subdirectory structure 209, 210 may designate or identify the destination printer 204 or print server 217 that will receive the print file. Additional subdirectories may be created for storing the print files according to their destinations. When the print file is transferred across the one-way data link 205, the same directory/subdirectory structure 209, 210 of the print file created on the send platform 201 is replicated on the receive platform 202 as shown in directory/subdirectory 214, 215 in FIG. 2.

In this particular embodiment illustrated in FIG. 2, receive platform 202 manages printing, in particular print spooling, so the receive platform 202 will be called a "print spooling platform." Print spooling platform 202 may be linked to one or more printers 204 or print server(s) 217 that are capable of receiving and processing print files. Printer(s) 204 or print server(s) 217 may be part of a network operating under a specified network security parameters, such as a higher security or lower security network.

A print file capture application 216 may reside on print spooling platform 202. The print file capture application 216 may comprise a post-processing application (e.g., script, executable, program, etc.) to transfer the print file to the destination printer 204 or print server 217. For example, the print file capture application 216 may run a TCP client application to automatically transfer the print files from the subdirectories 215 on which they have been stored on the print spooling platform 202 to the IP address of destination printer 204 or print server 217. The print file capture application 216 may also communicate with printers 204 or print servers 217 and control or manage spooling or queuing of print files to be printed in the event the destination printers 204 or print servers 217 are busy, unresponsive or otherwise unavailable.

To further enhance the security of the printing system 200, a pair of file scanning applications 212 and 213 may reside on send platform 201 and print spooling platform 202, respectively. The file scanning applications 212 and 213 may be directory and file transfer applications: The file scanning application 212 on the send side may segment the files to be transferred across the one-way data link 205 into proprietary data packets; and the file scanning application 213 on the receive side may then re-assemble the data packets into the files having the original directory/subdirectory structure after they cross the one-way data link. In other words, in at least one embodiment, the print file may be transmitted across a one-way data link as a stream of segmented proprietary data packets, which are re-assembled after reaching the receive platform 202.

The file scanning applications 212, 213 may also scan or filter the files, including print files, that are transferred across the one-way data link 205 between the send and print spooling platforms 201, 202. For example, the file scanning applications 212, 213 may incorporate anti-virus scanners to perform malware and virus scanning of the print files to be sent between the send platform and the print spooling platform. The file scanning application 212, 213 may first filter on file extension type (e.g., .txt, .doc, .ppt) and may further examine the content of the print file. Accepted file types are scanned for malware and viruses. File types that do not meet the user file-extension criteria set by the file scanning application may be quarantined.

In addition, a set of data filters 211 may also be deployed on the send platform 201. Data filters 211 may include anti-virus or malware scan, print file format checking, or any other content management filters applicable to print files. In alternative embodiments (not shown in FIG. 2), data filters may be deployed on the print spooling platform or on both the send and print spooling platforms.

We now describe an exemplary operation of the system illustrated in FIG. 2. A print job is generated and sent from print source 203 to send platform 201. The print job may be addressed to the IP addresses of printers 204, print servers 217 or other addresses on a destination network. Alternatively, the print job may be addressed to TCP/IP ports on send platform 201 corresponding to printers or destinations on a destination network.

A print server proxy application 208 residing on the send platform 201 may be configured to provide network connectivity between send platform 201 and print sources 203. For example, print server proxy application 208 may be configured to implement TCP protocol and maintain a TCP socket with one or more of the print sources 203.

Print server proxy application 208 receives the print job from the print source 203 and converts it into one or more print files in a printable format that is recognizable to printer 204 and/or print server 217. After the print job is converted into a print file, the print file is stored in a directory 209/ subdirectory 210 created on or downloaded to the send platform 201. The directory/subdirectory structure 209, 210 may designate or identify the printer 204 or print server 217 to receive and process the print file. Additional subdirectories may be created for storing the print files according to their destinations. In some embodiments, send platform 201 may run an application (e.g., a script, executable, program, etc.) to monitor downloaded subdirectories for the print files to be sent across the one-way data link 205.

After the print file is transferred across the one-way data link 205, the subdirectories 210 created in the directory 209 on the send platform 201 are replicated on the print spooling platform 202, and the print file is stored in subdirectory 215 in a directory 214 created on or downloaded to the print spooling platform 202. In some embodiments, print spooling platform 202 may run an application (e.g., script, executable, program, etc.) to monitor the downloaded subdirectories for the print files to be sent to printer 204 or print server 217.

A print file capture application 216 may reside on print spooling platform 202. In some embodiments, print file capture application 216 may include one or more post-processing applications (e.g., scripts, executables, programs, etc.) to monitor downloaded directories 214 and subdirectories 215 for print files. Post-processing applications may be configured such that multiple post-processing applications reside on print spooling platform 202, and each application is set up to detect files addressed to a particular network destination. When a post-processing application finds a new print file to be printed, the print file capture application 216 delivers the print file to its destination printer 204 or print server 217.

In some embodiments, the print file capture application 216 is a TCP client type application, which may function similarly to the print server proxy application 208 on the send side. The print file capture application 216 may be configured to fully implement TCP protocol, and may also be configured to communicate with and receive status messages from printers 204 and other print file destinations. In this way, the print file capture application 216 may be able to re-send print files if the destination printer is busy, off-line, or otherwise unavailable. Additionally, the print file capture application 216 with appropriate post-processing applications may operate as a print spooler to pass along received print files as the printer 204 and/or print file destinations become available to receive more data. In some embodiments, the print file capture application 216 comprises or uses a print spooling application provided by the operating system used in the print spooling platform 202 (e.g., Windows print spooler in MICROSOFT WINDOWS). In some embodiments, the print file capture application 216 with appropriate post-processing applications may copy an entire downloaded subdirectory to an address on the destination network.

System 200 may further comprise file scanning applications 212 and 213. According to some exemplary embodiments, file scanning applications 212, 213 function as gatekeepers, regulating the content transmitted over, or received from, one-way data link 205.

The file scanning application 212 on send platform 201 may operate in conjunction with a file scanning tool in data filters 211 and a series of applications (e.g., scripts, executables, programs, etc.) for implementing a file scan and regulating the passage of files, including print files. File scanning tool may be any suitable malware/antivirus scanners and other content management filters known in the art, such as, but not limited to, CLAM ANTIVIRUS, McAfee VirusScan Command Line Scanner™ and Symantec Scan Engine™ Persons of skill in the relevant field will appreciate that in some embodiments, multiple scanning applications can be run concurrently. In addition, the file scanning applications 212, 213 may also run an application (e.g., script, executable, program, etc.) for scanning files to confirm that the file extension is of an acceptable type, or that the file itself is a print file or other suitable file type.

File scanning application 212 may also comprise the following three applications: FileSend, ScanFile, and ScanFile-xxxx. In some embodiments, the FileSend application regularly scans the directories 209 and subdirectories 210 for print file and other files to be processed and sent across one-way data link 205. Upon detecting a file for transmission, FileSend may call the ScanFile application, which in turn may call one or more file scanning applications, specified as ScanFile-xxxx which invokes a scan of the file by scanning tool(s) from data filters 211. The "xxxx" refers to the file scanning tool(s) of the data filters 211 invoked by the application. For example, where CLAM ANTIVIRUS is one of the file scanning tools, the application invoking a scan by this program may be designated ScanFile-clamscan. Once file scanning tool(s) from the data filters 211 have completed their scan and made a determination as to whether the scanned file is virus-free and/or satisfies other user-defined security criteria, the ScanFile-xxxx application may return an exit code to the calling application, ScanFile. According to an exemplary embodiment, the exit codes may be 0, 1, and 2, wherein 0 indicates that no problems have been detected with the scanned file, 1 indicates that a problem has been detected, and the file will be quarantined, and 2 indicates that the scanning application has not been found and that the calling application will exit. Where the exit codes indicate that no problems have been detected with the print files, scanning application 212 may allow the print file to be transmitted over one-way data link 205.

In at least one embodiment, the file scanning application 213 on the print spooling platform 202 may function similarly to its counterpart 212 on send platform 201 in that it may be configured to act as a gatekeeper for print spooling platform 202 and printers 204 and quarantine files that do not satisfy predefined security criteria. In the embodiment shown in FIG. 2, unlike the send platform 201, the print spooling platform 202 does not have data filters containing scanning tool(s). In that case, the functions performed by the ScanFile application may be performed by post-processing application in the print file capture application 216, rather than by the file scanning application 213. In alternative embodiments, data filters containing scanning tool(s) may reside on the print spooling platform so that the file scanning application on the print spooling platform may perform the ScanFile application in conjunction with the scanning tools from data filters.

Figure 3:
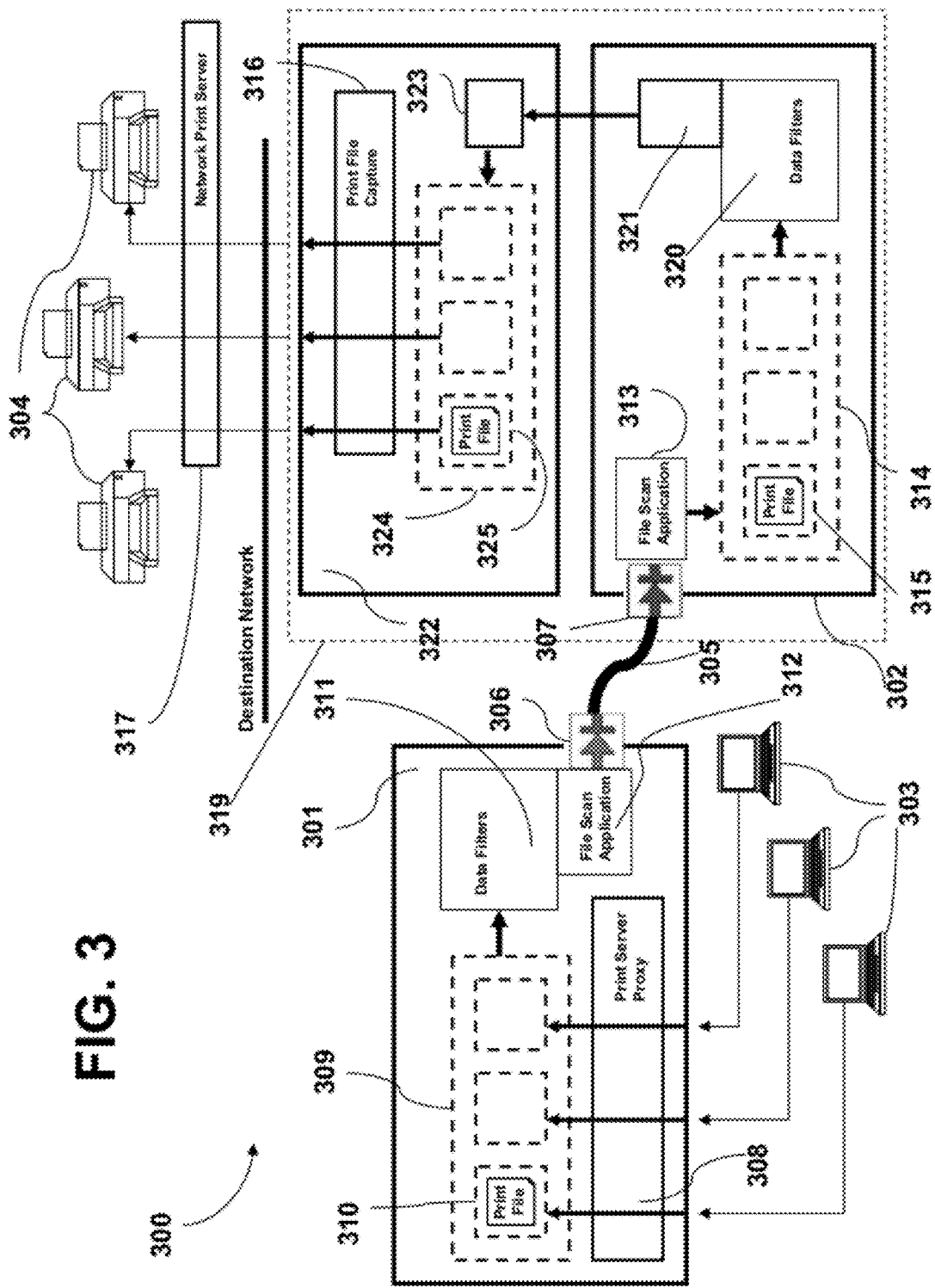
FIG. 3 is a schematic diagram of another exemplary embodiment of the present invention.

FIG. 3 is a schematic diagram of an alternative embodiment of the present invention directed to a system 300 for routing and queuing print jobs across a one-way data link 305. Unlike the embodiment illustrated in FIG. 2, print spooling platform 319 comprises at least two separate platforms—a first platform 302 for receiving print files from one-way data link 305, and a second platform 322 for receiving the print files from the first platform 302 and spooling the print files. In the system 300, a send platform 301 and the first platform 302 are connected to one another by one-way data link 305. In some embodiments, the one-way data link 305 may comprise an optical fiber connected at one end to send-only interface circuitry 306 (e.g., optical transmitter) residing on or coupled to the send platform and connected at the opposite end to receive-only interface circuitry 307 (e.g., optical receiver) residing on or coupled to the first platform 302. Send platform 301 may comprise one or more computers running any suitable operating system known in the art, including, but not limited to, UNIX, MICROSOFT WINDOWS, or LINUX. Furthermore, first platform 302 and second platform 322 on the print spooling side may comprise computers running on different operating systems. For example, first platform 302 may use either UNIX, LINUX, or MICROSOFT WINDOWS, while second platform may comprise a computer using MICROSOFT WINDOWS having Windows print spooling application.

Send platform 301 may be linked to one or more print sources 303 which may be other machines or computers capable of generating and sending a print job to the send platform. According to some embodiments, print source 303 prints to a TCP/IP port maintained by a print server proxy application 308. Additionally, print source 303 may be part of a network operating under a specific set of network security parameters, such as a lower security or higher security network.

A print server proxy application 308 may reside on send platform 301, receive a print job from print source 303 and convert the print job into one or more print files in a printable format that is recognizable to printer 304 and/or print server 317. Once converted from a print job, the print files may then be stored in a directory 309 or subdirectory 310 on the send platform 301 before being transferred to the first platform 302 on the receive side across the one-way data link 305. The directory/subdirectory structure 309, 310 may designate or identify the destination printer 304 or print server 317 that will receive the print file. Additional subdirectories may be created for storing the print files according to their destinations. When the print file is transferred across the one-way data link 305, the same directory/subdirectory structure 309, 310 of the print file created on the send platform 301 is replicated on the first platform 302 as shown in directory/subdirectory 314, 315 in FIG. 3.

In the embodiment illustrated in FIG. 3, while first platform 302 is linked to one-way data link 305, second platform 322 is linked to one or more printers 304 or print server(s) 317 capable of receiving and processing print files. Printer(s) 304 or print server(s) 317 may be part of a network operating under a specified network security parameters, such as a lower security or higher security network.

Second platform 322 is configured to receive print files from first platform 302. Print files may be transferred from first platform 302 to second platform 322 via TCP/IP packets through configurable TCP sockets 321 and 323 that allow remote replication of the entire directory/subdirectory structure 314, 315 of print files (as shown in directory/subdirectory structure 324, 325 on second platform 322) and ensures end-to-end file integrity through endpoint message digests and hash validation.

A print file capture application 316 resides on second platform 322. The print file capture application 316 may comprise a post-processing application (e.g., script, executable, program, etc.) to transfer the print files to the destination printer 304 or print server 317. For example, the print file capture application 316 may run a TCP client application to transfer the print files from the subdirectories 325 on which they have been stored on the second platform 322 to the IP address of destination printer 304 or print server 317. The print file capture application 316 may also communicate with printers 304 or print servers 317 and control or manage spooling or queuing of print files to be printed in the event the destination printers 304 or print servers 317 are busy, unresponsive or otherwise unavailable.

To further enhance the security of the printing system 200, a pair of file scanning applications 312 and 313 may reside on send platform 301 and first platform 302, respectively. The file scanning applications 312 and 313 may be directory and file transfer applications: The file scanning application 312 on the send side may segment the files to be transferred across the one-way data link 205 into proprietary data packets; and the file scanning application 313 on the receive side may then re-assemble the data packets into the files having the original directory/subdirectory structure after they cross the one-way data link. In other words, in at least one embodiment, the print file may be transmitted across a one-way data link as a stream of segmented proprietary data packets, which are re-assembled after reaching the first platform 302.

The file scanning applications 312, 313 may also scan or filter the files, including print files, that are transferred across the one-way data link 305 between the send and first platforms 301, 302. For example, the file scanning applications 312, 313 may incorporate anti-virus scanners to perform malware and virus scanning of the print files to be sent between the send platform and the first platform. The file scanning application 312, 313 may first filter on file extension type (e.g., .txt, .doc, .ppt) and may further examine the content of the print file. Accepted file types are scanned for malware and viruses. File types that do not meet the user file-extension criteria set by the file scanning application may be quarantined.

In addition, a set of data filters 311 may also be deployed on the send platform 301. Data filters 311 may include anti-virus or malware scan, print file format checking, or any other content management filters applicable to print files. FIG. 3 shows that data filters 320 may also be deployed on first platform 302 on the receive side. The file scanning applications 312, 313 and data filters 311, 320 in the embodiment of FIG. 3 may operate and function similarly to their counterparts in the embodiment shown in FIG. 2, which are described above.

We now describe an exemplary operation of the system illustrated in FIG. 3. A print job is generated and sent from print source 303 to send platform 301. The print job may be addressed to the IP addresses of printers 304, print servers 317 or other addresses on a destination network. Alternatively, the print job may be addressed to TCP/IP ports on send platform 301 corresponding to printers or destinations on a destination network.

A print server proxy application 308 residing on the send platform 301 may be configured to provide network connectivity between send platform 301 and print sources 303. For example, print server proxy application 308 may be configured to implement TCP protocol and maintain a TCP socket with one or more of the print sources 303.

Print server proxy application 308 receives the print job from the print source 303 and converts it into one or more print files in a printable format that is recognizable to printer 304 and/or print server 317. After the print job is converted into a print file, the print file is stored in a directory 309/subdirectory 310 created on or downloaded to the send platform 301. The directory/subdirectory structure 309, 310 may designate or identify the printer 304 or print server 317 to receive and process the print file. Additional subdirectories may be created for storing the print files according to their destinations. In some embodiments, send platform 301 may run an application (e.g., script, executable, program, etc.) to monitor downloaded subdirectories for the print files to be sent across the one-way data link 305.

After the print file is transferred across the one-way data link 305, the subdirectories 310 created in the directory 309 on the send platform 301 are replicated on the first platform 302, and the print file is stored in subdirectory 315 in a directory 314 created on or downloaded to the first platform 302. In some embodiments, the first platform 302 may run an application (e.g., script, executable, program, etc.) to monitor the downloaded subdirectories for the print files to be sent to second platform 322 and ultimately to printer 304 or print server 317.

In some embodiments, print files may be transferred from first platform 302 to second platform 322 via TCP/IP packets through configurable TCP sockets 321 and 323 that allows remote replication of the entire directory/subdirectory structure 314, 315 of print files (as shown in directory/subdirectory structure 324, 325 on second platform 322) and ensures end-to-end file integrity through endpoint message digests and hash validation.

A print file capture application 316 resides on second platform 322. In some embodiments, print file capture application 316 may include one or more post-processing applications (e.g., scripts, executables, programs, etc.) to monitor directories 324 and subdirectories 325 for downloaded print files. Post-processing applications may be configured such that multiple post-processing applications reside on second platform 322, and each application is set up to detect files addressed to a particular network destination. When a post-processing application finds a new print file to be printed, the print file capture application 316 delivers the print file to its destination printer 304 or print server 317.

In some embodiments, the print file capture application 316 is a TCP client type application, which may function similarly to the print server proxy application 308 on the send side. The print file capture application 316 may be configured to fully implement TCP protocol, and may also be configured to communicate with and receive status messages from printers 304 and other print file destinations. In this way, the print file capture application 316 may be able to re-send print files if the destination printer is busy, off-line, or otherwise unavailable. Additionally, the print file capture application 316 with appropriate post-processing applications may operate as a print spooler to pass along received print files as the printer 304 and/or print file destinations become available to receive more data. In some embodiments, the print file capture application 316 comprises or uses a print spooling application provided by the operating system used in the second platform 322 (e.g., Windows print spooler in MICROSOFT WINDOWS). In some embodiments, the print file capture application 316 with appropriate post-processing applications may copy an entire downloaded subdirectory to an address on the destination network.

Now that embodiments of the present invention have been shown and described in detail, various modifications and improvements thereon will become readily apparent to those skilled in the art. Accordingly, the exemplary embodiments of the invention, as set forth above, are intended to be illustrative, not limiting. The spirit and scope of the present invention is to be construed broadly and limited only by the appended claims, and not by the foregoing specification.

What is claimed is:

1. A system for routing a print job from a source computer coupled to a first network in a first security domain to a networked printer coupled to a second network in a second different security domain or to a networked printer server coupled to the second network, comprising:
   a send platform computer in the first security domain coupled to the first network, the send platform having an output and configured to receive a print job from the source computer via the first network, to convert the received print job into a print file, and to forward the print file on the output;
   a one-way data link having an input coupled to the output of the send platform computer and an output, the one-way data link configured to transfer data only from the input to the output and to prevent any signal from passing from the output to the input;
   a print spooling platform computer in the second security domain coupled to the networked printer via the second network and only coupled to the send platform computer via an input coupled to the output of the one-way data link, the print spooling platform computer configured to receive the print file via the input from the one-way data link, to forward the print file as a network print job to the networked printer or to the networked printer server.

2. The system of claim 1, wherein:
   the send platform computer is configured to run a print server proxy application for converting the print job into the print file.

3. The system of claim 1, wherein:
   the print spooling platform computer is configured to run a print file capture application for forwarding the print file as a network print job to the networked printer or to the networked printer server.

4. The system of claim 1, wherein the print spooling platform computer comprises:
   a first platform configured to receive the print file from the one-way data link; and
   a second platform configured to receive the print file from the first platform, and to forward the print file as a network print job to the networked printer or to the networked printer server.

5. The system of claim 4, wherein the second platform is configured to run a print file capture application for forwarding the print file as a network print job to the networked printer or to the networked printer server.

6. The system of claim 4, wherein the first platform using UNIX operating system and the second platform computer uses MICROSOFT WINDOWS operating system.

7. The system of claim 4, wherein the first platform and the second platform use different operating systems.

8. The system of claim 1, wherein the print file is transmitted across the one-way data link as a stream of segmented proprietary data packets.

9. The system of claim 1, wherein the print file is stored in a subdirectory on the send platform computer before being transferred to the one-way data link.

10. The system of claim 1, wherein the send platform computer monitors downloaded subdirectories for the print file to be sent across the one-way data link.

11. The system of claim 1, wherein the print spooling platform computer monitors downloaded subdirectories for the print file to be sent to the networked printer or to the networked printer server.

12. The system of claim 1, wherein the print spooling platform computer runs a post-processing application to transfer the print file to the networked printer or to the networked printer server.

13. The system of claim 1, wherein the print spooling platform computer runs a TCP client application to automatically transfer the print file to the IP address of the networked printer or the networked printer server.

14. The system of claim 1, wherein the print file is stored on the print spooling platform computer if the networked printer or the networked printer server is occupied or otherwise unavailable.

15. The system of claim 1, wherein the send platform computer comprises a file scanning application for scanning the print file to be transferred across the one-way data link.

16. The system of claim 15, wherein the file scanning application performs anti-virus scan on the print file.

17. The system of claim 15, wherein the file scanning application filters on a file extension type of the print file.

18. The system of claim 15, wherein the print file that fails the criteria of the file scanning application is quarantined.

19. The system of claim 1, wherein the print spooling platform computer is configured to run a file scanning application for scanning the print file received from the one-way data link.

20. The system of claim 19, wherein the file scanning application performs anti-virus scan on the print file.

21. The system of claim 19, wherein the file scanning application filters on a file extension type of the print file.

22. The system of claim 19, wherein the print file that fails the criteria of the file scanning application is quarantined.

23. A method for printing a print job originating at a source computer on a first network in a first security domain to a networked printer on a second network in a second different security domain or to a networked printer server on the second network, comprising the steps of:
   receiving a print job from the source computer at a send platform computer in the first security domain via the first network;
   converting the received print job into a print file, and then transferring the print file to an input of a one-way data link, the input of the one-way data link directly coupled to the send platform, the one-way data link having an output and configured to transfer data only from the input to the output and to prevent any signal from passing from the output to the input;
   receiving the print file from the output of the one-way data link at a print spooling platform computer in the second security domain, the print spooling platform computer coupled to the send platform computer only via an input coupled to the output of the one-way data link; and
   forwarding the print file as a network print job to the networked printer or to the networked printer server via the second network.

24. The method of claim 23, wherein the steps of receiving the print file and forwarding the print file are performed on different platforms.

* * * * *